United States Patent [19]
Bischoff et al.

[11] Patent Number: 5,862,449
[45] Date of Patent: Jan. 19, 1999

[54] PHOTOCATALYTIC REACTOR

[75] Inventors: Brian L. Bischoff, Knoxville; Douglas E. Fain, Oak Ridge; John A. D. Stockdale, Knoxville, all of Tenn.

[73] Assignee: The United States of America as represented by the United States Department of Energy, Washington, D.C.

[21] Appl. No.: 974,421

[22] Filed: Nov. 19, 1997

Related U.S. Application Data

[63] Continuation of Ser. No. 668,603, May 30, 1996, abandoned.

[51] Int. Cl.[6] .................................................. C02F 1/32
[52] U.S. Cl. ............................................... 422/186.3
[58] Field of Search ................................... 422/186.3

[56] References Cited

U.S. PATENT DOCUMENTS

| | | | |
|---|---|---|---|
| 1,642,187 | 9/1927 | Young, Jr. ............................... | 362/32 |
| 2,242,981 | 5/1941 | Pedersen ................................ | 362/32 |
| 3,718,814 | 2/1973 | Van Slyke .............................. | 240/8.16 |
| 4,733,332 | 3/1988 | Yamashita et al. ...................... | 362/32 |
| 4,888,114 | 12/1989 | Gaddis et al. . | |
| 4,936,663 | 6/1990 | Mori ..................................... | 350/96.15 |
| 4,984,862 | 1/1991 | Mori ..................................... | 350/96.1 |
| 5,035,784 | 7/1991 | Anderson et al. . | |
| 5,118,422 | 6/1992 | Cooper et al. . | |
| 5,137,607 | 8/1992 | Anderson et al. . | |
| 5,207,669 | 5/1993 | Baker et al. ............................ | 606/7 |
| 5,233,679 | 8/1993 | Oyama ................................... | 385/146 |
| 5,302,356 | 4/1994 | Shadman et al. . | |
| 5,308,454 | 5/1994 | Anderson . | |
| 5,374,405 | 12/1994 | Firnberg et al. ...................... | 422/186.3 |
| 5,468,699 | 11/1995 | Zhang et al. . | |
| 5,531,969 | 7/1996 | Tamme et al. ........................ | 422/186 |

OTHER PUBLICATIONS

"Illuminated Membranes Cleanse Groundwater" *Oak Ridge National Laboratory Review*, vol. 27, No. 3, 1994, p. 20.
Ollis et al "Destruction of Water Contaminants" *Environ Sci Technol.*, vol. 25, No. 9, 1991 pp. 1523–1529.
Fox et al "Heterogeneous Photocatalysis", *Chem. Rev.* 1993, 93, 341–357.
Tyner, C.E. "Application of Solar thermal technology to the destruction of hazardous wastes" Solar Energy Materials 21 (1990) 113–129.

*Primary Examiner*—Daniel J. Jenkins
*Attorney, Agent, or Firm*—Emily G. Schneider; Stephen D. Hamel; William R. Moser

[57] ABSTRACT

A photocatalytic reactor for processing selected reactants from a fluid medium comprising at least one permeable photocatalytic membrane having a photocatalytic material. The material forms an area of chemically active sites when illuminated by light at selected wavelengths. When the fluid medium is passed through the illuminated membrane, the reactants are processed at these sites separating the processed fluid from the unprocessed fluid. A light source is provided and a light transmitting means, including an optical fiber, for transmitting light from the light source to the membrane.

15 Claims, 4 Drawing Sheets

PHOTOCATALYTIC REACTOR

This application is a continuation of application No. 08/668,603 filed May 30, 1996, now abandoned.

BACKGROUND OF THE INVENTION

This invention relates generally to photocatalytic reactors and more particularly to a photocatalytic reactor having at least one permeable photocatalytic membrane. The United States Government has rights to this invention pursuant to Contract No. DE-AC05-84OR21400 with Lockheed Martin Energy Systems, Inc. awarded by the U.S. Department of Energy.

The use of photocatalysis for in situ environmental remediation and other applications is a growing area of research. In the process of photocatalysis generally, the illumination of the surface of a photocatalyst, such as an oxide semiconductor, produces chemically active sites associated with excited electron-hole pairs. The positive holes migrate to the semiconductor surface and participate in oxidation reactions, while the electrons are scavenged by an oxidizer such as oxygen. The complete mineralization (reduction to $CO_2$, $H_2O$, and halogen ions) of many halogenated organics such as trichloroethylene has been shown to proceed by these oxidation-reduction reactions at such active sites on the photocatalyst surface.

In photocatalysis, the molecule to be changed must contact or closely approach the photocatalyst surface. Most photocatalysis research to date has used slurries of small titanium dioxide particles, mixed with the dissolved substances of interest, in order to keep the titanium dioxide photocatalytic surfaces as close as possible to the molecules dissolved in the slurry. However, because subsequent recovery of particles of photocatalyst from a treated liquid can be difficult and creates an additional step, various methods for immobilization of the photocatalyst have been attempted. Such methods include coating the photocatalyst on glass beads, inside tubes of glass or Teflon, on fiberglass, or on woven mesh. In these systems, however, the convenience of catalyst immobilization is achieved at the expense of increased average convective-diffusion distance from fluid to catalyst surface.

Some research has focused on the use of inorganic ceramic membranes as a means by which to fix the photocatalyst. By immobilizing the photocatalyst in a membrane, molecules to be treated are brought into contact with the photocatalytic surface as the liquid passes through the membrane, thus allowing for continuous processing and decreased diffusion distances. U.S. Pat. No. 5,035,784, issued Jul. 10, 1991, describes the degradation of organic chemicals with a titanium ceramic membrane. However, this patent discloses a "membrane" comprised of a porous film coated on a non-porous glass substrate, such as beads or slides. Because the glass substrate is not porous, a constant concentration gradient is required to drive the contaminant reactants into the pores of the film. As the concentration of contaminant reactants decreases exponentially with time, the decomposition rate decreases. As a result, this system cannot completely eliminate the presence of contaminant reactants, and thus the effective efficiency of the system decreases over the duration of the reaction.

Surface illumination is another important aspect of photocatalysis. In U.S. Pat. No. 5,035,784 and in other work addressing the use of photocatalysis for decomposition of contaminants, large ultraviolet lamps are used to illuminate the photocatalyst, whether fixed on a support or as a slurry. Such lamps are limited in that they cannot effectively illuminate the membrane, particularly if the membrane is small (i.e. a few millimeters) and if in situ remediation is desired. The use of a large lamp in such a system also has disadvantages in that the system is not easily scaled up for in situ use.

In the above-referenced patent, a light delivery system comprising an optical fiber coated with a photocatalyst is also described. However, the use of a coated optical fiber has disadvantages in that the photocatalyst is coated on a non-porous support, and the contaminants cannot flow through such a support, thereby decreasing the efficiency of the process. Moreover, in this system, the photocatalytic coating is illuminated from the back, and thus, direct illumination of the surface of the photocatalyst is not possible. Such a configuration decreases the effectiveness of the process because fewer chemically active sites can be formed.

Accordingly, a need in the art exists for a photocatalytic reactor having at least one permeable photocatalytic membrane which permits either a gas or liquid fluid medium containing selected reactants to flow through the membrane so that the chemically active sites on the surface of the permeable photocatalytic membrane will have constant contact with the reactants and a light transmission system which directly illuminates the membrane, allows for in situ use of the photocatalytic reactor, and allows the reactor to be easily scaled to a particular application.

SUMMARY OF THE INVENTION

In view of the above need, it is an object of this invention to provide a photocatalytic reactor having at least one permeable photocatalytic membrane in which chemically active sites are formed when the surface is illuminated by a fiber optic light transmission means and which permits a fluid medium containing selected reactants to flow through the membrane.

Another object of this invention is to provide a photocatalytic reactor as in the above object further including a light transmission means which directly illuminates the photocatalytic surface to maximize the formation of chemically active sites.

A further object of this invention is to provide a photocatalytic reactor as in the above objects which allows for in situ use of the photocatalytic reactor and allows the reactor to be easily scaled in membrane size and number to a particular application.

Briefly, the present invention is a photocatalytic reactor for processing selected reactants from a fluid medium comprising at least one permeable photocatalytic membrane having a photocatalytic material, the material forming chemically active sites at which processing of the reactants occurs upon the passing of the medium through the membrane when the area is illuminated by light at selected wavelengths corresponding to the formation of the active sites; a light source which emits light at the selected wavelengths; a light transmitting means including an optical fiber cable for transmitting light from the light source to the membrane at the selected wavelengths to illuminate the membrane; and means for continually passing at least a portion of the medium containing the reactants through the membrane. The term processing as used herein includes, but is not limited to, decomposing reactants into innocuous by-products, selectively extracting metal species from process streams, and the like, by the use of the photocatalytic reactor described herein.

Additional objects, advantages, and novel features of the invention will be set forth in part in the description which follows, and in part will become apparent to those skilled in the art upon examination of the following or may be learned by the practice of the invention. The objects and advantages may be realized and attained by means of the instrumentalities and combinations particularly pointed out herein and in the appended claims.

BRIEF DESCRIPTION OF THE DRAWINGS

The accompanying drawings, which are incorporated in and form a part of the specification, illustrate preferred embodiments of the invention, and together with the description, serve to explain principles of the invention.

DETAILED DESCRIPTION

Figure 1:
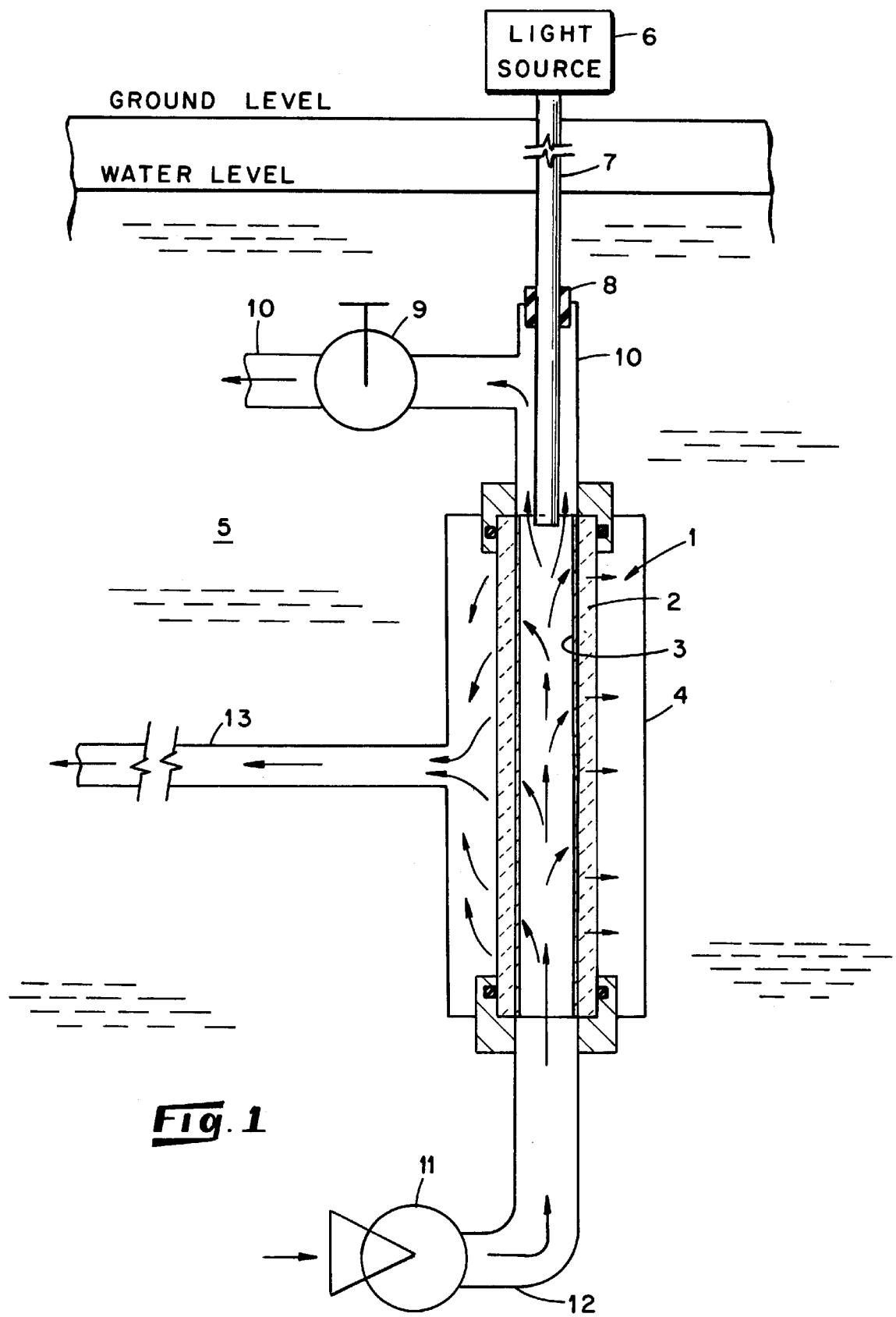
FIG. 1 is a schematic diagram illustrating a photocatalytic reactor made in accordance with the present invention for in situ processing of a fluid medium, such as an aquifer as shown here.

Referring now to FIG. 1, wherein the photocatalytic reactor of the present invention is illustrated using a tubular membrane for in situ processing of a fluid medium 5, a permeable photocatalytic membrane 1 formed of a tubular inorganic porous support 2 is coated on the inner surface with a photocatalytic material 3. The tube 2 is disposed within a housing 4 to allow the flow of a portion of the medium through the membrane. The preferred photocatalytic material is titanium dioxide in the anatase form ($TiO_2$), however, other semiconducting materials such as ZnO, $WO_3$, $Cu_2O$, CdS, and CdSe can also be used. Anatase is an oxide semiconductor having a valence band gap of approximately 3.2 eV. Therefore, light at a wavelength of from about 350 to about 380 nm is needed for the excitation of electrons from the valence band to the conduction band in order to form chemically active sites associated with the electron-hole pairs.

The porous support 2 may be either metallic or ceramic. Such a support may be fabricated by methods described in the literature or obtained commercially from Golden Technologies Company, Inc., Golden, CO or Pall Corporation, East Hills, N.Y. Although the present invention is illustrated here using a porous tubular support, it will be understood that other shapes, such as discs, may be employed depending on the desired application. Further, for some applications, it may be advantageous to form the entire porous membrane from the desired photocatalytic material.

The permeable membrane 1 may be fabricated by the method disclosed in U.S. Pat. No. 4,888,114, issued Dec. 19, 1989, incorporated herein by reference. The membrane may also be made by coating a thin layer of titanium dioxide on the inside of a porous support by sol-gel processing using literature methods. Briefly, a sol is prepared by the controlled hydrolysis of a titanium alkoxide followed by a peptization step. A gel is then deposited as a thin film on the inside wall of the support by slipcasting of the titanium dioxide sol. Firing the membrane at 325° C. affixes a thin anatase layer to the surface of the permeable membrane.

In the illustrated embodiment, the diameter of the tubular membrane used can vary from about a few millimeters to approximately 10 cm, while the length can vary from about 5 cm to about 1 meter.

Figure 4:
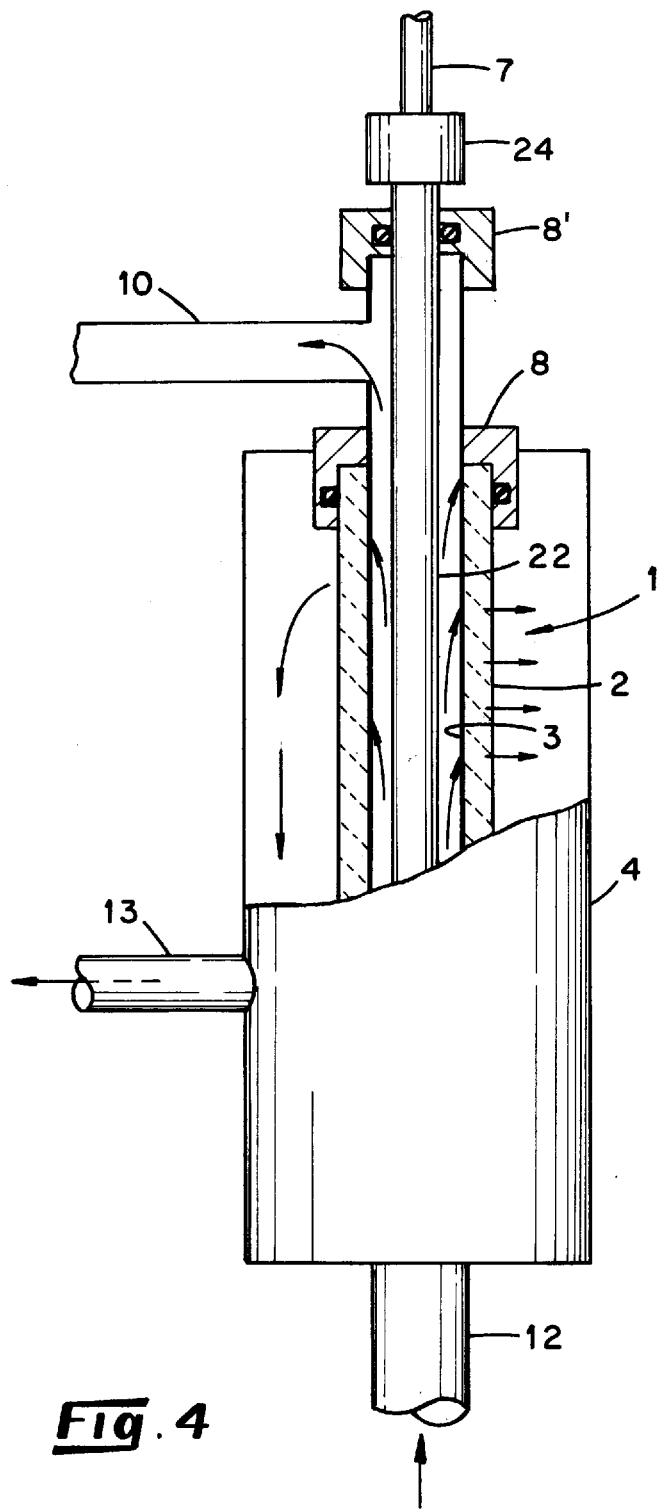
FIG. 4 is a schematic diagram illustrating a cylindrical light distributing means of the photocatalytic reactor as shown in FIG. 1. Like reference numerals indicate identical parts to those shown in FIG. 1.

Primarily, the length and diameter of the membrane is limited only by the ability to uniformly illuminate the photocatalytic surface of the membrane by means of the light transmission system described herein below. The particular size and/or shape of the membrane may be dictated by the application in which the system is used. For example, if the medium to be processed has a large content of dissolved matter which tends to cloud the medium, it may be necessary to provide a configuration in which the light source is very close to the photocatalytic surface of the membrane to prevent excessive absorption of the light by the medium. As illustrated in FIG. 4, if tubular membranes are used, it may be advisable to use a small diameter tubular membrane 1 with a cylindrical light distributing means 22 optically coupled to the fiber optic cable 7 and inserted into the membrane 1, such as a small quartz rod with a surface etching treatment to diffuse the light transmitted thereto. The size of the rod is only slightly smaller than the inside diameter of the membrane to provide a narrow flow path between the light source and the photocatalytic inner surface of the membrane. Alternatively, for a clear medium, the membrane diameter may be larger and the light may be simply introduced at one end of the tubular membrane through a light coupling means at the end of the fiber optic, such as a lens (not shown), and allowed to diffuse through the medium to illuminate the photocatalytic surface of the membrane. In addition, for large applications, it may be desirable as described below herein to use a plurality of membranes.

Figure 3:
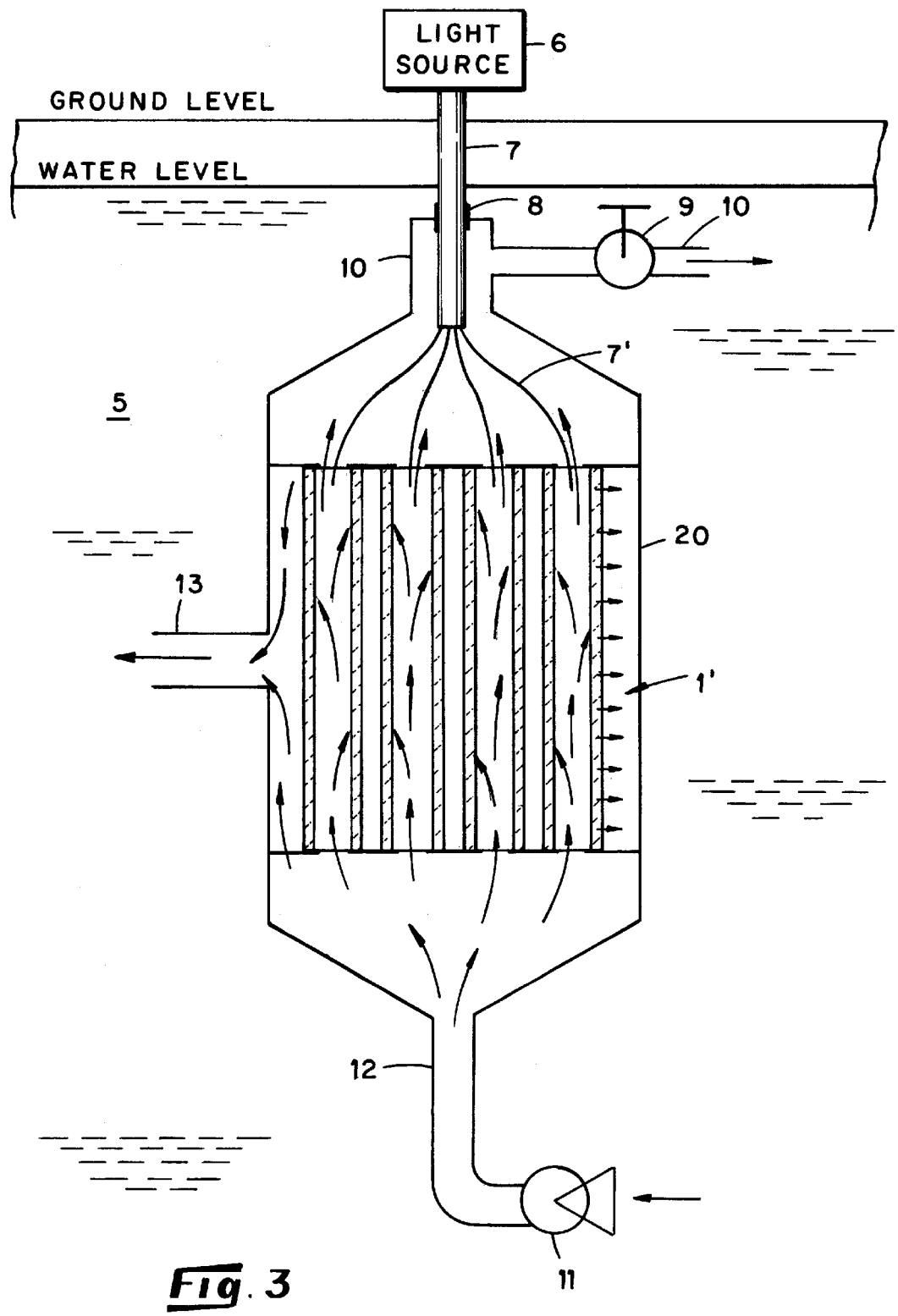
FIG. 3 is a schematic diagram illustrating the photocatalytic reactor of FIG. 1 having a plurality of membranes in a parallel flow arrangement. Like reference numerals indicate identical parts to those shown in FIG. 1.

Referring again to FIG. 1, the light transmission system of the present invention comprises a light source 6 which emits light in the near-ultraviolet (UV) range (about 350 to about 380 nm) and a multimode optical fiber cable 7 extending from the light source 6 to the membrane. A seal 8, such as a compression fitting, an elastomer, is provided to allow pressurization of the medium within the housing 4. Preferably, the optical fiber cable only extends to a point near one end of the tubular membrane and is optically coupled via various means, as described above, to illuminate the photocatalytic surface of the membrane to form chemically active sites. The light source can be a standard mercury arc lamp, UV laser, solar radiation, or other source of UV light. The optical fiber cable as used in the illustrated embodiment has flat polished ends and a diameter of 1 mm, and provides a cone of near-UV light to directly and evenly illuminate a tubular membrane having an inside diameter from about 0.8 cm to about 1.9 cm. In another embodiment as shown in FIG. 4, the optical fiber cable 7 may be coupled to a solid quartz rod 22 via a conventional optical coupler 24. A seal 8' is provided at the upper end of the exhaust line 10. The rod 22 has an etched surface to diffuse light from the surface, as indicated above, and inserted into the membrane 1. The opposite end of the rod could also be silvered or modified in shape in order to reflect light back into the rod, thereby increasing uniform diffusion of light over the length of the membrane. Once light is injected into the end of the rod via the coupled optical fiber, the light is internally reflected along the length of the rod and diffuses out from the modified surface to illuminate the membrane. The use of the optical fiber cable is important because it permits a variety of configurations depending upon the amount and/or type of the medium to be remediated. For example, as shown in FIG. 3, the light source 6 can be coupled to a cable 7 formed of a fiber optic bundle to illuminate a plurality of membranes in a parallel flow arrangement disposed in a common housing 20. Individual fibers 7' extend to the respective upper ends of the membranes 1'. In addition, the use of the optical fiber allows for versatility in the choice of any of the above light sources and permits placement of the light source at a remote location, while the photocatalytic membrane could be placed in situ. For example, the photocatalytic membrane portion of the reactor could be placed in a well to clean contaminated groundwater or located in a corrosive or industrial environment.

The pore size of the membrane affects the rate at which the reactants permeate the membrane and also influences the rate at which the reactants come into contact with the photocatalytic material. The size of the pores is dependent on the concentration of the reactants contained in the medium to be processed and should allow for an optimum combination of flow rate through the membrane and exposure of reactants contained in the medium to the illuminated photocatalytic material. Typical pore sizes might range from 20 angstroms to several microns.

Referring now to FIG. 1, the flow rate through the permeable membrane can be adjusted by the use of a regulator valve 9 provided in an exhaust line 10 connected to the exhaust flow end of the housing 4. In this case, the valve is used to adjust the desired fraction of the total flow through the membrane by controlling the pressure across the membrane. As shown in FIG. 1, a pump 11 connected in the inlet line 12 is provided with an inlet in fluid communication with the medium 5 being processed for pumping the medium into the housing 4. A portion of the medium flows through the membrane 1 disposed in the housing 4, wherein the selected reactants contained in the medium react with the photocatalytic coating 3 of the membrane. This processed medium portion exits the housing via an outlet line 13, while the remaining unprocessed medium flows through the housing and exits via the exhaust line 10. In the application as illustrated here, the outlet line 13 through which the processed medium portion exits is preferably located some distance from the exhaust line 10 so that the unprocessed medium being drawn in by the pump 11 through the inlet line 12 is not diluted by the cleaned fraction exiting the outlet line and contains a high concentration of reactants. In addition, another advantage of such a configuration is that it prevents the buildup of gross debris on the surface of the membrane which tends to foul or plug the membrane. This provides good fluid dynamics to help keep the membrane from fouling. A prefilter means may also be attached to the pump to prevent fouling of the reactor by filtering out gross debris before the medium enters the reactor (not shown).

The photocatalytic reactor of the present invention can be used to remove reactants such as trichlorethylene and other volatile organic compounds (VOCs), and to remove dissolved metal species such as, but not limited to, technetium, strontium, cesium, gold, silver, platinum, and rhodium. These reactants may be contained in liquid mediums such as, but not limited to, contaminated groundwater or other process streams. VOCs may also be treated if present in gaseous streams containing water vapor. Air containing dilute organics would permeate the illuminated photocatalytic membrane and be completely mineralized to innocuous gases.

Figure 2:
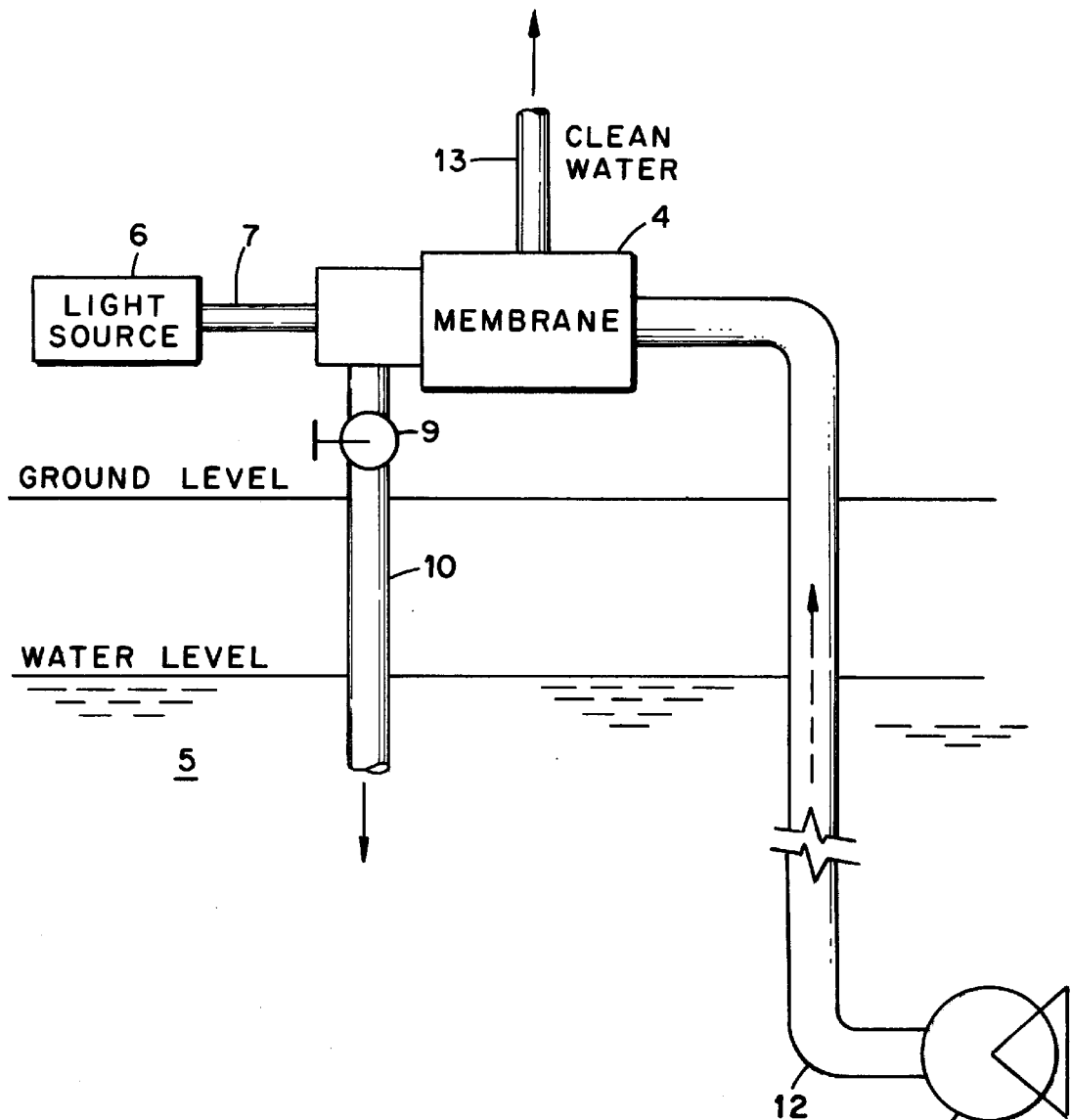
FIG. 2 is a schematic diagram illustrating the photocatalytic reactor system of FIG. 1 in which the aquifer medium is delivered to the system at a remote location by means of a pumping system. Like reference numerals indicate identical parts to those shown in FIG. 1.

For removal of VOCs from a liquid medium such as groundwater, the photocatalytic reactor of the present invention can be used in an in situ configuration as shown in FIG. 1 and described above, or in a pump and treat configuration as in FIG. 2. As shown in FIG. 2, the contaminated aquifer medium 5 containing the VOC reactants is pumped to the surface by the submersible pump 11 via the inlet line 12 and treated by passing it through the membrane contained in the housing 4 in the same manner as described above for FIG. 1. The VOC reactants passing through the membrane are completely mineralized to $H_2O$, $CO_2$, and HCl. The clean water produced can be immediately employed or returned to the aquifer via the outlet line 13.

The photocatalytic reactor of the present invention is also useful for remediating mixed waste solutions, i.e. solutions containing VOCs and radionuclides. It has been shown that technetium remains bound on the photocatalytic membrane surface, but redissolves back into solution once the UV illumination is turned off. Thus, a mixed waste solution containing both VOCs and technetium could be remediated by periodically removing the reactor from the waste solution while maintaining UV illumination and then placing the reactor in a receptacle. This container would collect the accumulated technetium which would redissolve when the UV light is discontinued. The radioactively clean photocatalytic membrane could then be placed again into the waste solution for further VOC destruction and simultaneous collection of technetium.

The reactor can also be used for metals stripping and recovery of metals such as platinum, gold, and rhodium. The metals are plated onto the photocatalytic surface under the action of UV illumination. They do not redissolve when the UV is turned off, but can be redissolved by chemical means such as acid treatment.

Another application of the present invention is for the preparation of ultrapure water. Ultrapure water is useful in the semiconductor and pharmaceutical industries which require water substantially free of contaminants during the manufacturing process.

Thus, it will be seen that a photocatalytic reactor for in situ processing of selected reactants from a fluid medium has been provided. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A photocatalytic reactor for processing selected reactants from a fluid medium comprising:

at least one permeable tubular photocatalytic membrane having an inner surface and an outer surface and formed of a photocatalytic material, said material forming chemically active sites on said inner surface at which processing of said selected reactants occurs upon the passing of at least a portion of said fluid medium radially through said membrane when said inner surface of said membrane is illuminated by light at selected wavelengths corresponding to the formation of said active sites;

a light source which emits light at said selected wavelengths;

a light transmitting means including an optical fiber cable for transmitting light from said light source to said inner surface of said membrane at said selected wavelengths to illuminate said inner surface;

an inlet line in fluid communication with said fluid medium and said membrane;

means for continually passing said fluid medium axially through said inlet line and said membrane;

a housing enclosing said membrane defining a collection chamber for collecting said processed portion of said fluid medium which passes radially through said membrane, said housing having an outlet line through which said processed portion of said fluid medium exits said housing; and an exhaust line through which the remaining unprocessed portion of said fluid medium exits said membrane after passing axially therethrough.

2. A photocatalytic reactor, as in claim 1, wherein said membrane is formed of a semiconducting photocatalytic material selected from the group consisting of $TiO_2$, ZnO, $WO_3$, $Cu_2O$, CdS, and CdSe.

3. A photocatalytic reactor for processing selected reactants from a fluid medium comprising:

at least one permeable tubular photocatalytic membrane having an inner surface and an outer surface and formed of an inorganic porous support having a coating disposed on said inner surface formed of a photocatalytic material, said material forming chemically active sites on said inner surface at which processing of said selected reactants occurs upon the passing of said fluid medium radially through said membrane when said inner surface is illuminated by light at selected wavelengths corresponding to the formation of said active sites;

a light source which emits light at said selected wavelengths;

a light transmitting means including an optical fiber cable for transmitting light from said light source to said inner surface of said membrane at said selected wavelengths to illuminate said inner surface;

an inlet line in fluid communication with said fluid medium and said membrane;

means for continually passing said fluid medium axially through said inlet line and said membrane;

a housing enclosing said membrane defining a collection chamber for collecting said processed portion of said fluid medium which passes radially through said membrane, said housing having an outlet line through which said processed portion of said fluid medium exits said housing; and an exhaust line through which the remaining unprocessed portion of said fluid medium exits said membrane after passing axially therethrough.

4. A photocatalytic reactor, as in claim 3, wherein said photocatalytic material is a semiconductor material selected from the group consisting of $TiO_2$, ZnO, $WO_3$, $Cu_2O$, CdS, and CdSe.

5. A photocatalytic reactor, as in claim 4, wherein said porous inorganic support is a ceramic support.

6. A photocatalytic reactor, as in claim 4, wherein said porous inorganic support is a metallic support.

7. A photocatalytic reactor, as in claim 3, wherein said selected wavelengths are in the range of from about 350 nm to about 380 nm.

8. A photocatalytic reactor, as in claim 3, wherein said fluid medium containing said reactants is a liquid.

9. A photocatalytic reactor, as in claim 3, wherein said fluid medium containing said reactants is a vapor.

10. A photocatalytic reactor as in claim 3, wherein said means for continually passing said fluid medium through said membrane includes a pump connected in fluid communication with said inlet line and a regulator means for regulating the flow of said fluid medium through said housing, thereby controlling the pressure across said membrane to regulate said portion of said fluid medium passing through said membrane.

11. A photocatalytic reactor as in claim 10, wherein said regulator means includes an adjustable flow valve disposed in said exhaust line.

12. A photocatalytic reactor as in claim 11, for in situ processing of selected reactants from a fluid medium, wherein said housing is adapted for location in situ and said light source is located remote from said in situ housing.

13. A photocatalytic reactor as in claim 12, wherein said light transmitting means further includes a light distributing means disposed within said tubular membrane for uniformly distributing light from said fiber optic cable to said inner surface of said membrane.

14. A photocatalytic reactor as in claim 13, wherein said at least one tubular membrane includes a plurality of tubular membranes disposed in a parallel flow arrangement within said housing and wherein said light transmitting means includes a plurality of fiber optic cables individually connected between said light source and corresponding ones of said plurality of said tubular membranes.

15. A photocatalytic reactor as in claim 13, wherein said light distributing means includes a cylindrical quartz rod optically coupled to said fiber optic cable at one end thereof and coaxially disposed within said tubular membrane to extend the full length of said membrane and having an etched outer surface.

* * * * *